SOLID STATE LIGHT TO ELECTROSTATIC CHARGE IMAGE TRANSDUCER

Original Filed April 5, 1960 2 Sheets-Sheet 1

LOUIS J. KABELL
*INVENTOR.*

*BY* Lyon & Lyon

ATTORNEYS.

SOLID STATE LIGHT TO ELECTROSTATIC CHARGE IMAGE TRANSDUCER

Original Filed April 5, 1960 2 Sheets-Sheet 2

LOUIS J. KABELL
*INVENTOR.*

BY Lyon & Lyon

ATTORNEYS.

United States Patent Office

Re. 26,067
Reissued July 19, 1966

26,067
SOLID STATE LIGHT TO ELECTROSTATIC CHARGE IMAGE TRANSDUCER

Louis J. Kabell, Palo Alto, Calif., assignor to A. B. Dick Company, Chicago, Ill., a corporation of Illinois Original No. 3,137,857, dated June 16, 1964, Ser. No. 20,060, Apr. 5, 1960. Application for reissue Sept. 3, 1965, Ser. No. 485,977
12 Claims. (Cl. 346—74)

Matter enclosed in heavy brackets [ ] appears in the original patent but forms no part of this reissue specification; matter printed in italics indicates the additions made by reissue.

This invention relates to apparatus for reproducing images using electrostatic charges on insulating surfaces and, more particularly, to improvements therein.

Some systems presently employed for converting an optical real image into a charge image pattern that may be rendered visible by application of powder particles are known as the Xerographic and the Electrofax processes. Both of these operate on the principle of using a photoconductive layer to discharge a previously charged surface in response to the light in an optical real image. Both of these processes are capable of producing a high quality image, but suffer from slow action of the photoconductive processes. Further, the delicate nature of the selenium photoconductive surface required for the Xerographic image conversion process necessitates extensive means for the protection thereof. The Electrofax process requires a rather expensive coated paper.

An object of the present invention is to provide a novel and useful system for producing charged images on an insulating surface in response to an illuminated image.

Another object of this invention is the provision of a rugged device for converting illuminated optical images into a charge pattern on a writing medium.

Yet another object of the present invention is the provision of apparatus for converting an illuminated optical image into an electrostatic charge pattern on a writing medium which can operate more rapidly than presently known processes.

Still another object of the present invention is the provision of a simple and inexpensive image converter which does not require an expensive writing medium.

These and other objects of this invention may be achieved by employing a plurality of photodiodes to which operating potential is applied. Illumination from an illuminated image is permitted to fall upon the light-sensitive areas of the plurality of photodiodes in such a manner that as the writing material is moved from between the photodiodes and the backing plate an electrostatic charge may either be deposited or removed, depending upon the nature of the photodiodes and the potential applied thereto. These electrostatic charges are deposited in accordance with the presence or absence of illumination upon the plurality of diodes. As a result, a charge image is applied to the paper which can be developed employing well-known Xerographic techniques, such as by dusting with a powder which adheres to those portions of the paper having a charge, and thereafter fixing the powder image by heat or chemical vapor, as required.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In accordance with this invention, a linear array of photodiodes or photoelectric cells made from solid-state materials, are illuminated by slit scanning the optical image desired to be reproduced. As will be shown herein, this apparatus can operate either by depositing charge on an uncharged surface, or by removing charge from a precharged surface. A preferred embodiment for a linear array of the photoelectric cells is exemplified in FIGURE 1. There may be seen a block of semiconductor material 10, such as, for example, a bar of monocrystalline silicon. The bar shown has a trapezoidal cross section. This is of no significance. Any suitable cross section may be employed. The important part of the bar shape, however, is the plurality of teeth 16A, 16B, 16C, 16D, which are formed at one edge of the bar. These teeth may be formed either by mechanical means or preferably by chemical etching whereby the spacing between them may be made smaller. As many of these teeth per inch with equal spacing of gaps and tips may be made as are required for good image resolution.

However, before forming the teeth, it is necessary to perform the operation known as "doping" the bar of semiconductor material. As is well known, a semiconductor material is first purified thoroughly and then in the manufacture of photodiodes, for example, one portion of the bar of material has an impurity consisting of P-type material or material having a deficiency of electrons added thereto, while another portion of the bar of semiconductor material has an N-type impurity added thereto, which is a material having an excess of electrons. The region between the P- and N-type materials is known as the junction. With the solid-state photodiodes the illumination is allowed to fall in the region of the junction, in response to which the resistance of the material changes, permitting a change of current to occur.

Figure 1:
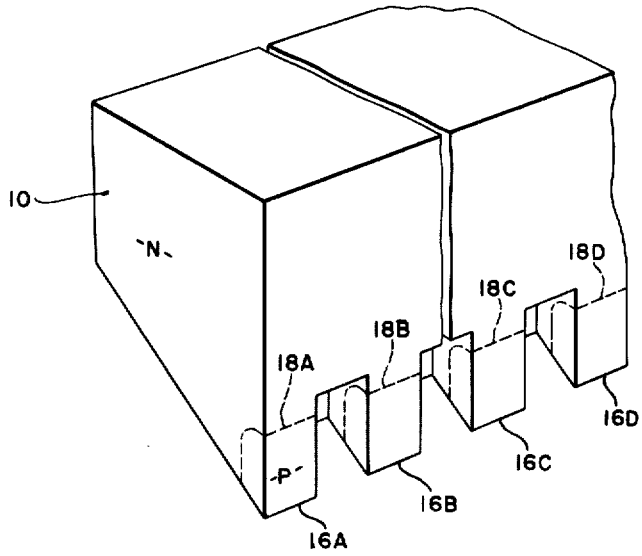
FIGURE 1 is an isometric view of an image converter in accordance with this invention.

As exemplified in FIGURE 1, the edge portion which is to be subsequently formed into the plurality of aligned teeth is doped with an impurity of one type, providing a semiconductor material having one type of impurity. This is exemplified in FIGURE 1 by the identification as P-type. The remainder of the semiconductor material block has the opposite impurity material and thus can be considered as N-type semiconductor material. Those skilled in the art will readily appreciate the fact that the edge from which the teeth are to be formed can be the N-type material, and the remainder of the block can be the P-type material, if desired. After the semiconductor material block has been properly doped, the teeth are then cut into the material. As shown, the cut is made so that the tip of the teeth will comprise one type of semiconductor material, and the remainder of the teeth will comprise the other type of semiconductor material. The formation of the teeth is made so that the junction between the two tyyes of semiconductor material exists at each one of the teeth. The junction at each one of the teeth is represented by the dotted lines, respectively designated by 18A, 18B, 18C, and 18D.

Figure 2:
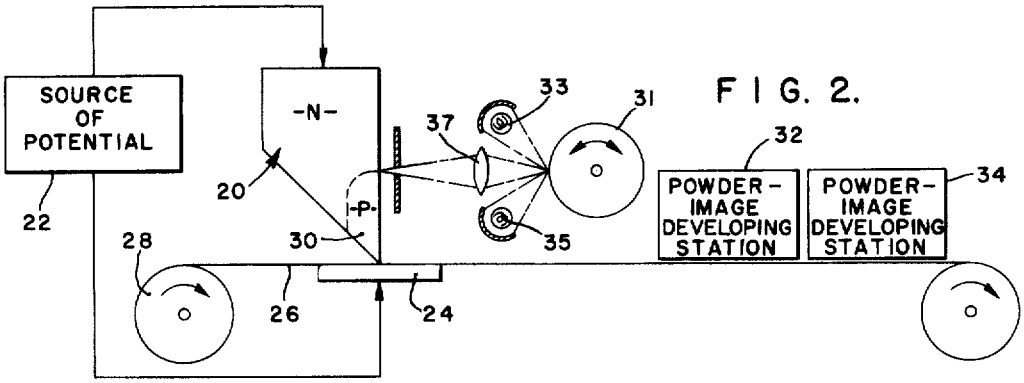
FIGURE 2 shows an arrangement for utilizing the embodiment of the invention.

FIGURE 2 illustrates the embodiment of the invention. The plurality of solid-state photodiodes 20, shown endwise, have the structure represented by the isometric drawing in FIGURE 1. The plurality of photodiodes has what might be called a common electrode, which is effectively that portion of the block of material other than the teeth. A source of potential 22 has one connection made to the common electrode. Another connection is made to the conductive backing plate 24. A writing medium 26, consisting of paper, is fed from a roll 28 between the backing plate 24 and the teeth 30 and in contact therewith. The copy to be reproduced is mounted on a rotatable drum 31. Two light sources 33, 35 illuminate a line of the copy. The illuminated line image is focused by the lens 37 through the slot of a mask onto the P-N junction of the plurality of photodiodes, while the paper 26 is being advanced past the teeth tips of the plurality of photodiodes. The current which can flow, and therefore the electrostatic charges deposited or removed from the writing medium, depending upon the manner of operation, is a function of the intensity of the light shining on the P-N junctions. Each photodiode is controlled in response to the light in the increment of the line length which falls thereon. Each photodiode deposits an electrostatic charge on the paper in accordance therewith. It will be appreciated that as the paper 26 is moved out from under the teeth of the pluarlity of photodiodes, an electrostatic charge image exists thereon, corresponding to the variations and illumination from the image which had fallen upon the P-N junctions.

The paper next passes under a powder-image developing station 32, which literally dusts the paper with a brush or other suitable means known to the art, as a result of which the powder will cling to the paper wherever an electrostatic charge is deposited. Thereafter, the paper is moved to a powder image fixing station 34, comprising another well-known expedient which fixes the powder to the paper, either by applying heat or chemical vapor, or other suitable fixer.

Figure 3:
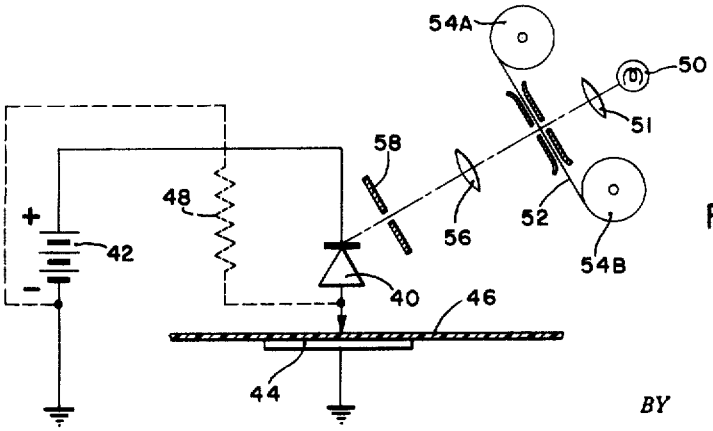
FIGURES 3 and 4 are electrical schematic drawings illustrating the circuits required for operating the embodiment of the invention.

FIGURE 3 is a schematic diagram of the electrical circuit which employs a photodiode exemplified by the diode 40, which has P-type semiconductor material at the tip with the remainder of the photodiode being N-type semiconductor material. The source of potential 42 is connected to the photodiode so that the positive potential is applied to the N-type material, and the negative potential is applied to the P-type semiconductor material in a path which includes the conductive backing plate 44 and the dielectric sheet 46. There is shown in dotted lines a resistor 48, which is connected between the P-type tip to ground. It can happen that the construction of the electrostatic image converter may be such that the capacitance from the charge-depositing tip of the photodiode to the backing plate, which is at ground potential, may be small compared to the junction capacitance. This would prevent effective electrostatic writing. To avoid this, a load resistance such as the resistor 48 is provided for each junction. This can be accomplished through the application of combinations of thin insulating and conductive films directly on the semiconductor surface.

Also shown in FIGURE 3 is a light 50, which is focused on a transparency 52 being fed between two rolls 54A, 54B. A line of the light image from the transparency is focused on the P-N junction by means of a lens 56 and mask 58 having an opening slot which is only wide enough to admit said line.

Figure 4:
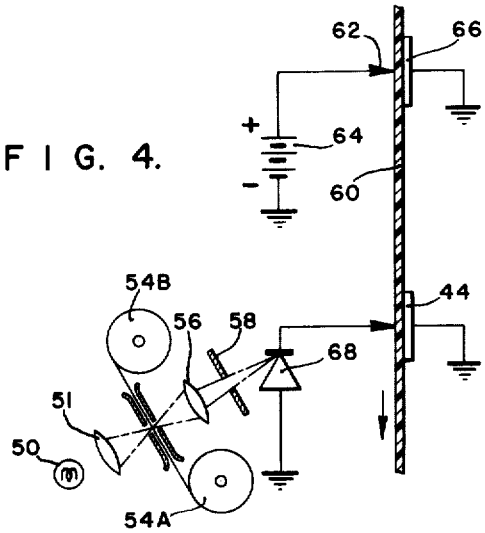

FIGURE 4 shows an electrical circuit arrangement for the embodiment of the invention whereby charge is removed from the precharged writing medium, as a result of which an image is obtained which is the negative of the type of image obtained with the arrangement shown in FIGURE 3. The writing medium 60 is first passed through a charging station comprising an electrode tip 62, which is connected to a high positive source of potential 64. A backing plate 66, on the opposite side of the writing medium, completes the circuit back to the source of potential 64. Thus, as the writing medium moves through the charging station defined by the electrode 62 and backing plate 66, is receives electrostatic charges. Thereafter, the writing medium moves under the teeth of the plurality of photocells represented here by the diode 68. The remaining apparatus for illuminating the P-N junction of the diode 68 and the backing plate 44 remain the same as previously represented in FIGURE 3. The diode 68, however, in this situation, will have N-type semiconductor material forming the tips of the teeth with the remainder of the material being P-type. Thus, as the photodiodes are rendered more or less conductive in response to the variations of illumination of the optical image, charges from the writing medium are permitted to flow through the photodiodes and be neutralized. Such neutralization occurs by virtue of the fact that the backing plate 44 as well as the common electrode portion of the photodiodes are connected together.

Figure 5:
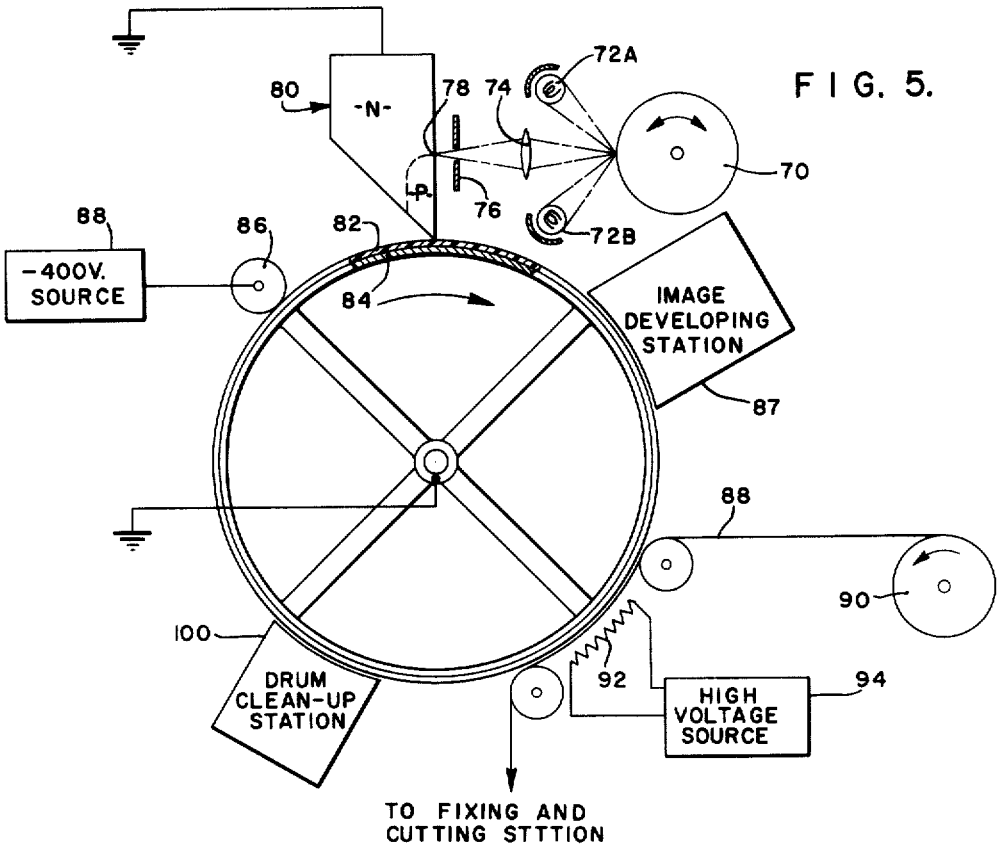
FIGURE 5 illustrates another arrangement for utilizing the embodiment of the invention.

FIGURE 5 illustrates another arrangement of the embodiment of the invention for providing an electrostatic duplication of a light image. Here, a drum 70 has wrapped around it the material which it is desired to be copied. Illumination of a line of said material is provided by two light sources 72A, 72B. The light from these sources is focused on a line of the drum, and the resulting light modulations are reflected to a lens 74, which focuses them through the slit in a mask 76 upon the junction 78 of the comb-type plurality of photodiodes 80. The common electrode, consisting of the block of N material of the photodiode 80, is connected to ground. The tips of the teeth of the plurality of photodiodes are in contact with the dielectric surface 82, which covers a metallic drum 84. Such dielectric surface may be made of any suitabl material, such as Mylar, for example. The metallic drum here serves as the backing plate. It, too, is connected to ground. A roller 86 connected to a high negative-potential source 88, here exemplified by −400 volts, applies negative electrostatic charges to the dielectric medium, which is rotated past this drum-charging roller 86.

As the charged dielectric medium moves past and in contact with the teeth of the plurality of photodiodes, charges are removed from the surface in accordance with the light modulation of the P-N junctions 78 of the plurality of photodiodes. As a result, an image is formed on the dielectric surface, corresponding to the light image of the copy carried by the drum 70. This electrostataic image is next passed under an image-developing station 87, which deposits powder on only those portions of the dielectric surface which have electrostatic charges left.

After passing the image-developing station, the surface of the drum is brought in contact with paper 88 being fed from a roll 90. Behind this paper is a wire grid 92, which is kept at a high potential. This high potential is obtained from a high-voltage source 94. As a result, powder is drawn from the drum surface to the paper. It is carried thereafter to a fixing and cutting station, where the powder is fixed on the paper and the paper can then be cut, as desired. The drum then continues to move through a drum cleanup station 100, which merely consists of an arrangement for removing the powder from the drum, either by mechanical removal or electrical attraction. The drum can thereafter continue to move to receive a new charge from the drum-charging roller 86.

FIGURES 2 and 3 of the drawings show potential being applied to the photodiodes from a separate source whereby electrostatic charges may be deposited on the paper. FIGURES 4 and 5 show potential being applied to the photodiodes from the paper whereby electrostatic charges may be removed from the paper. Both arrangements leave an electrostatic image on the paper, the former being a positive image and the latter a negative image. In both instances the application of potential to the photodiodes includes the paper and/or the backing plate.

There has accordingly been described and shown herein a novel, useful, simple, and unique solid-state arrangement for providing an electrostatic charge image from an original which can then be developed.

I claim:

1. Apparatus for forming an electrostatic charge image of a light image on a dielectric writing medium comprising photodiode means having a common first electrode, a plurality of separate second electrodes each having means defining a writing surface at one end thereof, means forming a plurality of separate junctions between opposite ends of each of said second electrodes and said common first electrode, the region of each said plurality of separate junctions constituting a light-sensitive area, a conductive backing plate spaced opposite said second electrode writing surface, means for moving said dielectric writing medium in contact with and past said writing surfaces and between said writing surfaces and said backing plate, means for applying potential across said photodiode including said dielectric writing medium, and means for illuminating said plurality of light-sensitive areas with successive portions of said light image.

2. Apparatus for forming an electrostatic charge image of a light image on a dielectric writing medium comprising a plurality of photodiodes including a block of semiconductor material having an edge region formed into a plurality of aligned teeth, the end portion of each tooth being made of semiconductor material of one impurity type, the remainder of the material of each tooth and said block including semiconductor material of an opposite impurity type, there being a junction between said two impurity types of semiconductor material upon which said light image is directed, a conductive backing plate spaced opposite said plurality of aligned teeth, means for positioning said dielectric writing medium between said aligned teeth and said backing plate and in contact therewith, and means for applying potential across said photodiode including said dielectric writing medium.

3. Apparatus as recited in claim 2 wherein said dielectric writing medium and conductive backing plate includes a metal drum having a dielectric coating thereon, said means for positioning said dielectric writing medium between said aligned teeth and backing plate and in contact therewith includes a rotatable support for said drum for affording rotation thereof past said aligned teeth.

4. Apparatus as recited in claim 2 wherein the end portion of each tooth is made of an N-type impurity semiconductor material, the remainder of the material of each tooth and said block including P-type semiconductor material, and there is included a means for applying positive electrostatic charges to said dielectric writing material prior to positioning it between said aligned teeth and backing plate.

5. Apparatus as recited in claim 2 wherein the end portion of each tooth is made of a P-type impurity semiconductor material, the remainder of the material of each tooth and said block including N-type semiconductor material, and there is included a means for applying negative electrostatic charges to said dielectric writing material prior to positioning it between said aligned teeth and backing plate.

6. In apparatus for forming an electrostatic charge image of a light image on a dielectric writing medium, an improved transducer comprising a plurality of photo diodes including a block of semi-conductor material having an edge region formed into a plurality of aligned teeth, the end portion of each tooth being made of semiconductor material of one impurity type, and the remainder of the material of each tooth and said block including semi-conductor material of an opposite impurity type, there being a junction between said two impurity types of semi-conductor material upon which said light image is directed, and said dielectric writing medium being positioned to contact said plurality of aligned teeth.

7. The improvement as recited in claim 6 wherein the end portion of each tooth of said plurality of aligned teeth is made of an "N" type impurity semi-conductor material, the remainder of material of each tooth in said block including "P" type impurity semi-conductor material.

8. Apparatus as recited in claim 6 whereby the end portion of each tooth is made of "P" type impurity semiconductor material, the remainder of the material of each tooth and said block including "N" type impurity semi-conductor material.

*9. Apparatus for forming an electrostatic charge image of a light image on a dielectric writing medium comprising photodiode means having a common first electrode, a plurality of separate spaced second electrodes, means forming a separate light sensitive junction between said common first electrode and one side of each of said plurality of separate spaced second electrodes, means including a conductive backing plate and the other sides of said plurality of separate spaced electrodes for establishing a writing region, means for moving said writing medium through said writing region, a source of potential having two output terminals, means for connecting one of said output terminals to said common first electrode, means connecting the other of said output terminals to said backing plate, resistive means connecting said other of said output terminals to each of said second electrodes, and means for illuminating said plurality of light sensitive areas with successive portions of said light image.*

*10. Apparatus as recited in claim 9 wherein said resistive means comprises a separate resistor connected between the other sides of each of said spaced electrodes and said other of said output terminals.*

*11. Apparatus for forming an electrostatic charge image of a light image on a dielectric writing medium comprising a plurality of photodiodes including a relatively large block of semiconductor material of one impurity type having joined to one side thereof a plurality of spaced isolated small blocks of semiconductor material of a second impurity type, means for directing said light image at the junctions of said small blocks with said large block, a backing plate, means including said backing plate and the side of each of said small blocks opposite to the side joined to said large block for establishing a writing region, a source of potential having two output terminals, means for connecting one of said output terminals to said relatively large block of semiconductor material, means for connecting the other of said output terminals to said backing plate, resistive means connecting said other of said output terminals to each of said small blocks of semiconductor material, and means for moving said writing medium through said writing region to receive a charge image from said small blocks.*

*12. Apparatus as recited in claim 11 wherein said resistive means comprises a plurality of resistors a separate one of which is connected between each of said small blocks and said other of said output terminals.*

References Cited by the Examiner

The following references, cited by the Examiner, are of record in the patented file of this patent or the original patent.

UNITED STATES PATENTS

| | | | |
|---|---|---|---|
| 2,764,693 | 9/1956 | Jacobs et al. | 346—74 |
| 2,776,367 | 1/1957 | Lehovec | 307—88.5 |
| 2,794,863 | 6/1957 | Van Roosbroeck | 250—211 |
| 2,890,923 | 6/1959 | Huebner | 346—74 |
| 2,925,310 | 2/1960 | Perkins | 346—74 |
| 2,932,548 | 4/1960 | Nau et al. | 346—74 |

OTHER REFERENCES

Publication: "New Intermetallics Offer Wide Infrared Response," by Nicolosi et al., Electronic Engineering ed., July 4, 1958, pages 48–51.

BERNARD KONICK, *Primary Examiner.*

A. I. NEUSTADT, *Assistant Examiner.*